(12) United States Patent
Laugt

(10) Patent No.: US 6,886,782 B2
(45) Date of Patent: May 3, 2005

(54) SYSTEM FOR SUPPLYING AN AIRCRAFT WITH COOL AIR

(75) Inventor: Paul Laugt, Martignas (FR)

(73) Assignee: Dassault Aviation, Paris (FR)

(*) Notice: Subject to any disclaimer, the term of this patent is extended or adjusted under 35 U.S.C. 154(b) by 222 days.

(21) Appl. No.: 10/121,475

(22) Filed: Apr. 8, 2002

(65) Prior Publication Data

US 2002/0162345 A1 Nov. 7, 2002

(30) Foreign Application Priority Data

Apr. 6, 2001 (FR) .............................. 01 04687

(51) Int. Cl.⁷ .............................................. B64D 13/00
(52) U.S. Cl. .................................................. 244/118.5
(58) Field of Search .............................. 244/208, 209, 244/130, 118.5, 58, 53 B, 53 R

(56) References Cited

U.S. PATENT DOCUMENTS

| 2,721,456 A | 10/1955 | Whitney, Jr. et al. |
| 3,752,422 A | 8/1973 | Runnels et al. ......... 244/118 R |
| 4,261,416 A | * 4/1981 | Hamamoto |
| 4,312,191 A | 1/1982 | Biagini ........................ 62/402 |
| 4,483,147 A | * 11/1984 | Evans et al. |
| 4,840,036 A | 6/1989 | Spraker, Jr. .................. 62/172 |
| 4,901,528 A | * 2/1990 | Saigo et al. |
| 5,273,486 A | * 12/1993 | Emmons et al. |
| 5,791,982 A | * 8/1998 | Curry et al. |
| 5,884,873 A | * 3/1999 | Breit |
| 5,967,461 A | * 10/1999 | Farrington |

FOREIGN PATENT DOCUMENTS

GB          1 436 697          5/1976

OTHER PUBLICATIONS

XP002184651, SU 594 676, 1996, Dmitriev.

* cited by examiner

*Primary Examiner*—Tien Dinh
(74) *Attorney, Agent, or Firm*—Jacobson Holman PLLC

(57) ABSTRACT

A cool air supply system includes a cool air inlet to a cabin of an aircraft fed with air cooled in a heat exchanger swept by a flow of external air from a static air inlet of the aircraft. The system further includes an ejector assembly for circulating external air in the exchanger. The ejector assembly includes a nozzle fed with air from the cabin of the aircraft via a cabin air outlet.

18 Claims, 1 Drawing Sheet

SYSTEM FOR SUPPLYING AN AIRCRAFT WITH COOL AIR

The present invention relates to a cool air supply system for supplying an aircraft with air cooled in at least one heat exchanger through which flows external air drawn from a static air inlet of the aircraft.

BACKGROUND OF THE INVENTION

As shown in FIG. 1 of the accompanying drawing, a prior art system of this kind includes one or more heat exchangers 1 fed with air from a stage of a compressor of a propulsion jet engine of the aircraft, for example. The air is cooled by external air flowing through the heat exchanger from an air inlet 2 on the outer skin 3 of the aircraft, The external air passes through a pipe 4 and is returned to the exterior via an outlet 5 of the pipe, also on the fuselage 3.

The air cooled in the heat exchangers 1 is fed to various ancillary units, turbines, water separator, etc., and is blown into the cabin 6 of the aircraft, for example through a cool air inlet 7 in a wall 8 of the cabin.

A cabin air outlet 9 also passes through the cabin wall and is equipped with a pressurization valve 10 by means of which the air pressure in the cabin is regulated to a predetermined set point value, usually of the order of 700 to 900 mb at cruising altitude.

A system of the above kind is known in the art, in particular from French patent application No. 99 14147 filed 10 Nov. 1999 by the applicant, which may be referred to for further details concerning the arrangement of the heat exchangers and the associated equipment.

One essential problem to be solved in systems of the above type is that of ventilating the heat exchangers, i.e. circulating external air in the pipe 4. A fan 11 In the pipe 4 downstream of the heat exchangers and driven by an electric motor 12 or a turbine can be used for this, as shown in FIG. 1.

This solution can be envisaged in conjunction with a static air inlet 2, as shown in FIG. 1, which is substantially tangential to the trajectory of the aircraft, or a "dynamic" air inlet, like that of the system described in the patent application previously cited, which is open toward the front of the aircraft so that external air is scooped into the air inlet.

Systems with dynamic air inlets have the disadvantage of operating only if the aircraft is travelling at sufficient speed. It is therefore essential to equip them with a fan for circulating air in the pipe when the aircraft is travelling at a low speed or is on the ground. A dynamic air inlet also increases the drag on the aircraft and necessitates the provision of de-icing means. The shape of the air inlet is very complex and requires many costly fabrication hours.

Systems with a static air inlet, like that described above with reference to FIG. 1, have the disadvantage of being inadequate at high altitudes if the fan is designed to operate with air of normal density at low altitude or on the ground. Because the density of the air at high altitudes is very low, the fan may then not provide a sufficient flow of air for the air that is to be blown into the cabinet to be cooled effectively. Consideration might then be given to equipping the system with two fans respectively designed to ventilate the heat exchangers at high altitudes and at low altitudes, but this solution is obviously costly.

Thought might also be given to ventilating the heat exchangers by means of an ejector fed with air taken from an air circuit between a source (propulsion or auxiliary engine) and the cabin, but this solution increases the energy consumed by the source and is therefore not economical either.

Thus an object of the invention is to provide a system for supplying an aircraft with cool air that is free of the drawbacks of the prior art systems previously mentioned and which in particular is economical in terms of energy consumption and manufacturing cost.

SUMMARY OF THE INVENTION

The above object of the present invention, and others that will become apparent on reading the following description, are achieved by a cool air supply system for supplying an aircraft with air cooled in a heat exchanger swept by a flow of external air from a static air inlet of the aircraft, which system is noteworthy in that it includes ejector means for circulating said external air in said heat exchanger, said ejector means including a nozzle fed with air from a cabin of the aircraft via an air outlet in said cabin.

As will be explained in more detail later, the above ejector means, fed in this way, remove the need for a dynamic air inlet and the costly associated equipment or for an additional fan designed to operate at high altitudes, and also recover energy from the cabin air, thereby reducing the energy consumption of the aircraft.

According to other features of the system according to the present invention:

- the heat exchanger and the ejector means are installed in series in a common external air pipe in said aircraft extending from said static air inlet to an outlet to the exterior,
- the ejector means are on the upstream or downstream side of said heat exchanger,
- the cabin air outlet is equipped with valve means mobile between a closed position in which cabin air passing through the outlet all enters said ejector means and an open position in which said air passes to the exterior.

BRIEF DESCRIPTION OF THE DRAWINGS

Other features and advantages of the present invention will become apparent on reading the following description and examining the accompanying drawing, in which.

DETAILED DESCRIPTION OF THE ILLUSTRATED EMBODIMENTS

Figure 1:
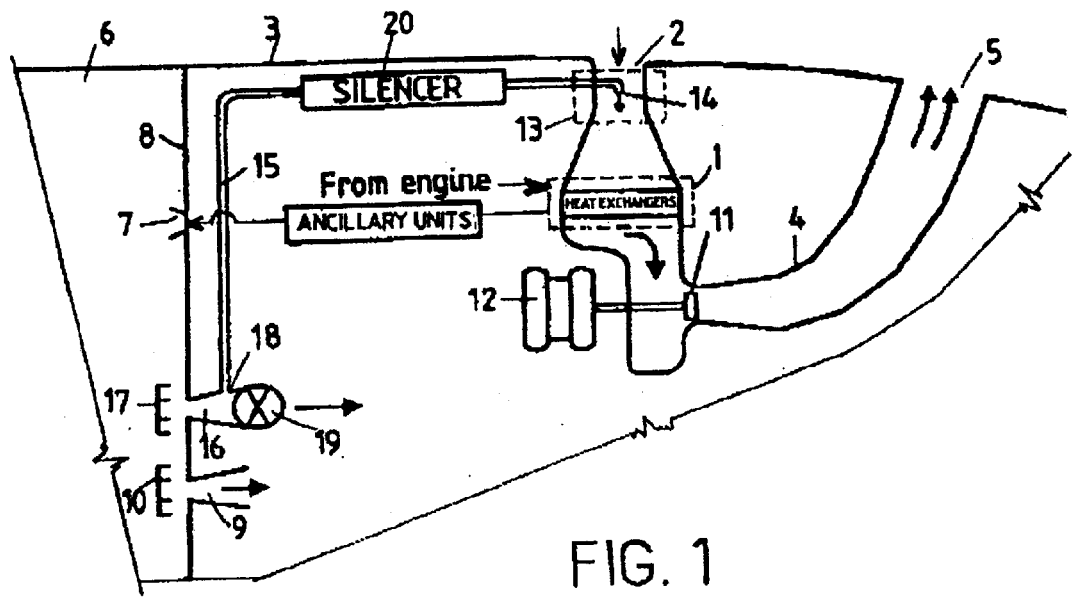
FIG. 1 is a diagrammatic view of a first embodiment of a system in accordance with the present invention, already partly described in the preamble to this description.

FIG. 1 of the accompanying drawing shows that the system according to the present invention includes, in addition to the units described above, ejector means 13 consisting of a section of the pipe 4 on whose axis is disposed an air nozzle 14. In the FIG. 1 embodiment, the ejector means 13 are disposed in the pipe 4, in series with the heat exchangers 1 and on the upstream side thereof, the outlet of the nozzle 14 being directed toward the heat exchangers.

The nozzle 14 is fed with air via a pipe 15 which, in accordance with the invention, is connected to a cabin air outlet 16. Like the outlet 9, the outlet 16 is equipped with a pressurization valve 17. It further includes, on the downstream side of the connection 18 of the pipe 15 to this outlet, valve means consisting, for example; of a valve 19 whose opening and closing are controlled by appropriate maneuvering means (not shown).

The FIG. 1 system operates in the following manner. When the aircraft is on the ground or at a low altitude, the motor 12 is activated to rotate the fan 11 which then circulates external air in the pipe 4 to cool, in the heat exchangers 1, the air coming from the engine of the aircraft, which is finally blown into the cabin 6 as cool air.

When the aircraft is on the ground or at a low altitude, the valve 19 is open and the cabin air pressure is regulated by the pressurization valves 10 and 17.

When the aircraft is at a high altitude, the fan 11 becomes substantially inoperative as it is designed to operate at low altitudes. The system then closes the valve 19, which automatically activates the elector 13, whose nozzle 14 is then fed with cabin air via the outlet 16. The flow of air injected into the pipe 4 in this way then causes forced circulation of external air in the pipe, from the static inlet 2 to the outlet of the pipe, this air therefore passing over the heat exchangers 1 to cool the air coming from the engine of the aircraft, which is injected at 7 into the cabin 6.

The air leaving the cabin via the outlet 16 passes first to the valve 17 which adjusts the flow section necessary to pressurize the cabin. It then enters the pipe 15, which is advantageously fitted with a silencer 20, before expanding as it exits the nozzle 14 of the ejector 13.

Because of the great difference in air pressure between the cabin and the exterior, the expansion of the cabin air in the nozzle 14 of the ejector 13 is very energetic and ensures proper ventilation of the heat exchangers 1.

Figure 2:
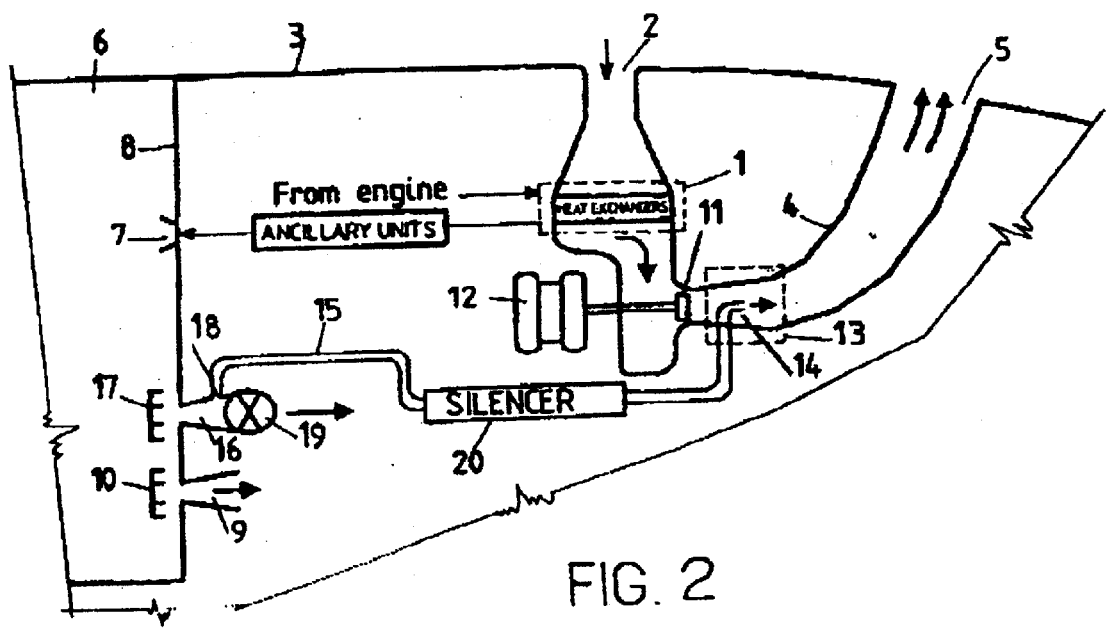
FIG. 2 is a view analogous to that of FIG. 1 of a second embodiment of the system.

In the FIG. 1 system, the ejector means 13 are on the upstream side of the heat exchangers. They can instead be on the downstream side of the heat exchangers and the fan 11, as shown in FIG. 2 of the accompanying drawing, which shows another embodiment of the invention, which is otherwise identical to that of FIG. 1 (in the two figures, the same reference number designates identical or similar units). The ejector means could also be installed between the heat exchangers 1 and the fan 11. By placing the ejector means on the upstream side of the heat exchangers, as shown in FIG. 1, the air ejected from the nozzle 14 contributes to the cooling of the heat exchangers, which reduces the flow of external air drawn in via the static inlet 2.

On the other hand, because of the moisture content of the cabin air, there is then a risk of the heat exchangers icing up.

The invention avoids this problem by placing the ejector means on the downstream side of the heat exchangers, or at least the first of them. This arrangement is advantageous, in efficiency terms, because at high altitudes it is preferable to ventilate the first exchanger with external air, at a low flowrate but at a very low temperature, rather than a mixture of external air and cabin air, at a higher flowrate but a higher temperature.

It is now apparent that the invention achieves the stated objectives, in particular from the economic point of view, because the system according to the invention dispenses with a dynamic air inlet and a second fan to circulate external air in the pipe 4 at high altitudes.

It also dispenses with bleeding supplementary air from the engines of the aircraft to feed an ejector since, in accordance with the invention, the ejector 14 is fed with cabin air, the expansion of which supplies the energy necessary to cause external air to flow in the pipe 4.

This results in a saving in terms of the energy to be supplied to the motor, which is added to the saving that results from reducing the drag on the aircraft by using a static air inlet instead of a dynamic air inlet. That saving is combined with the reduced fabrication costs resulting from using a static inlet or eliminating the fan for operation at high altitudes.

The silencer 20 reduces the noise caused by the expansion of the cabin air.

Of course, the invention is not limited to the embodiments described and shown, which are provided by way of example only. Accordingly, the ejector means could include a plurality of nozzles or a "multi-nozzle" for more complete diffusion of the air injected into the flow of external air, in particular when the length of the section of the pipe in which they are installed is insufficient to provide complete diffusion on its own. Thus the invention can be applied to air conditioning a compartment of the aircraft other than the passenger cabin, for example a compartment containing temperature-sensitive electronic equipment.

What is claimed is:

1. A cool air supply system for supplying an aircraft with cooled air, said cool air supply system comprising
   a heat exchanger swept by a flow of external air from a static air inlet of the aircraft, and
   an air ejector causing circulation of said external air to said heat exchanger, said air ejector including a nozzle fed with air directly from a cabin of the aircraft via an air outlet in said cabin.

2. The cool air supply system according to claim 1, wherein maid heat exchanger and said air ejector are installed in series in a common external air pipe in said aircraft extending from said static air inlet to an outlet to the exterior of the aircraft.

3. The cool air supply system according to claim 2, wherein said air ejector is an upstream side of said heat exchanger.

4. The cool air supply system according to claim 2, wherein said air ejector is on a downstream side of said heat exchanger.

5. The cool air supply system according to claim 1, wherein said cabin air outlet is equipped with a valve mobile between a closed position in which cabin air passing through the cabin air outlet all enters said air ejector and an open position in which said air passes to the exterior of the aircraft.

6. The cool air supply system according to claim 5, wherein said cabin air outlet is equipped with an overpressure valve.

7. The cool air supply system according to claim 6, further comprising a second air outlet in said cabin equipped with an overpressure valve.

8. The cool air supply system according to claim 1, wherein said air ejector is fed with cabin air via a pipe equipped with a silencer.

9. The cool air supply system according to claim 5, wherein said valve is closed when the aircraft is flying at a high altitude to activate said air ejector.

10. The cool air supply system according to claim 1, further comprising a ventilation device for circulating external air in the heat exchanger.

11. The cool air supply system according to claim 1, wherein said air ejector includes a plurality of cabin air nozzles.

12. The cool air supply system according to claim 1, wherein the cooled air produced is fed to a cool air inlet of said cabin.

13. A cool air supply for a cabin of an aircraft, said cool air supply comprising;

a static air inlet of the aircraft for receipt of external air;

an outlet of the aircraft leading to an exterior of the aircraft;

an air pipe connecting the static air inlet to the outlet of the aircraft;

a heat exchanger located in said air pipe for receiving air from an engine of the aircraft;

an air ejector located in said air pipe, said air ejector being directly fed with air from the cabin and said air ejector releasing air fed directly from the cabin into said air pipe for causing circulation of external air to the heat exchanger; and a cabin air inlet fed with air cooled by the heat exchanger.

14. The cool air supply system according to claim 13, wherein said air ejector is on an upstream side of said heat exchanger.

15. The cool air supply system according to claim 13, wherein said air ejector is on a downstream side of said heat exchanger.

16. The cool air supply system according to claim 13, wherein air to the heat exchanger passes through a pipe equipped with a silencer.

17. A cool air supply for a cabin of an aircraft, said cool air supply comprising:

a static air inlet of the aircraft for receipt of external air;

an outlet of the aircraft leading to an exterior of the aircraft;

an air pipe connecting the static air inlet to the outlet of the aircraft;

a heat exchanger located in said air pipe for receiving air from an engine of the aircraft and for directing cool air to an inlet of the cabin;

an air ejector located in said air pipe downstream from said heat exchanger;

an air outlet from the cabin; and a valve for directing air flow from the air outlet of the cabin directly to the air pipe or an exterior of the aircraft so that when said air flow from the air outlet of the cabin is directly directed to said air pipe, external air is caused to be circulated to the heat exchanger.

18. A cool air supply as claimed in claim 17, wherein a silencer is located in a path of the air flow between the air outlet from the cabin and the air pipe.

* * * * *